(12) United States Patent
Kowalchuk et al.

(10) Patent No.: US 11,064,651 B2
(45) Date of Patent: Jul. 20, 2021

(54) DOWN PRESSURE ADJUSTMENT DEVICE AND METHOD FOR USE WITH A DISC OPENER ASSEMBLY OF AN AGRICULTURAL IMPLEMENT

(71) Applicant: CNH Industrial Canada, Ltd., Saskatoon (CA)

(72) Inventors: Trevor Kowalchuk, Saskatchewan (CA); Robin B. Schilling, British Columbia (CA); Jack Turner, Saskatchewan (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 0 days.

(21) Appl. No.: 16/869,708

(22) Filed: May 8, 2020

(65) Prior Publication Data

US 2020/0260635 A1 Aug. 20, 2020

Related U.S. Application Data

(63) Continuation of application No. 16/508,613, filed on Jul. 11, 2019, now Pat. No. 10,667,461, which is a
(Continued)

(51) Int. Cl.
*A01C 7/20* (2006.01)

(52) U.S. Cl.
CPC ................... *A01C 7/205* (2013.01)

(58) Field of Classification Search
CPC ............... A01C 7/205; A01C 7/203
(Continued)

(56) References Cited

U.S. PATENT DOCUMENTS 3,233,680 A 2/1966 Arzoian et al.
3,394,474 A 7/1968 Rockwell
(Continued)

FOREIGN PATENT DOCUMENTS

CA 2549371 11/2007
DE 4121218 3/1992
(Continued)

OTHER PUBLICATIONS

Ahokas, Jukka, "The Effect of Ground Profile and Plough Gauge Wheel on Ploughing Work with a Mounted Plough," Agricultural Research Centre of Finland, Vakola Study Report 69, 1994, 92 pages.
(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

A disc opener unit for an agricultural implement has a down pressure adjustment device that automatically adjusts the amount of down pressure applied on a furrowing disc based on strain measurements taken by a strain gauge or load cell. The strain gauge, which may be mounted to an arm that is used to set the position of a depth setting gauge wheel, provides feedback to a processor that in turn controls the amount of hydraulic fluid in a hydraulic cylinder to adjust the down force applied on the disc. The amount of down pressure is therefore adjusted in substantially real-time in response to changes in field conditions, which improves furrow depth consistency and reduces wear on the gauge wheel and its components.

22 Claims, 4 Drawing Sheets

Related U.S. Application Data continuation of application No. 15/908,947, filed on Mar. 1, 2018, now Pat. No. 10,470,360, which is a continuation of application No. 12/820,759, filed on Jun. 22, 2010, now Pat. No. 9,968,030.

(58) Field of Classification Search
USPC .................................... 172/2, 744; 111/137
See application file for complete search history.

(56) References Cited

U.S. PATENT DOCUMENTS

| | | |
|---|---|---|
| 4,176,721 A | 12/1979 | Poggemiller et al. |
| 4,355,688 A | 10/1982 | Hamm et al. |
| 4,760,806 A | 8/1988 | Bigbee et al. |
| 4,909,331 A | 3/1990 | Defranco |
| 5,081,942 A | 1/1992 | Clark et al. |
| 5,234,060 A | 8/1993 | Carter |
| 5,499,683 A | 3/1996 | Bassett |
| 5,562,165 A | 10/1996 | Janelle et al. |
| 5,709,271 A | 1/1998 | Bassett |
| 5,727,638 A | 3/1998 | Woodrich et al. |
| 5,887,664 A | 3/1999 | Whalen et al. |
| 6,032,593 A | 3/2000 | Wendling et al. |
| 6,119,786 A | 9/2000 | Creger et al. |
| 6,386,127 B1 | 5/2002 | Prarie et al. |
| 6,389,999 B1 | 5/2002 | Duello |
| 6,644,223 B2 | 11/2003 | Prarie et al. |
| 6,701,857 B1 | 3/2004 | Jensen et al. |
| 6,827,029 B1 | 12/2004 | Wendte |
| 7,191,715 B2 | 3/2007 | Wendte et al. |
| 7,360,495 B1 | 4/2008 | Martin |
| 7,481,278 B1 | 1/2009 | Pomedli et al. |
| 7,540,333 B2 | 6/2009 | Bettin et al. |
| 7,814,847 B2 | 10/2010 | Schilling et al. |
| 8,036,797 B2 | 10/2011 | Johnson et al. |
| 8,275,525 B2 | 9/2012 | Kowalchuk et al. |
| 2010/0010667 A1 | 1/2010 | Sauder et al. |
| 2010/0180808 A1 | 7/2010 | Liu |

FOREIGN PATENT DOCUMENTS

| | | |
|---|---|---|
| DE | 19945853 | 3/2001 |
| EP | 0153102 | 8/1985 |
| EP | 0159948 | 10/1985 |
| EP | 0314640 | 5/1989 |
| EP | 0372901 | 6/1990 |
| EP | 2353354 | 8/2011 |
| ES | 2015185 | 8/1990 |
| FR | 1393243 | 3/1965 |
| FR | 2681213 | 3/1993 |
| WO | WO2009042238 | 4/2009 |

OTHER PUBLICATIONS

Choi, C. H., et al. "Automatic Depth Control System for Tractor Implement," 8 pages.

DOWN PRESSURE ADJUSTMENT DEVICE AND METHOD FOR USE WITH A DISC OPENER ASSEMBLY OF AN AGRICULTURAL IMPLEMENT

BACKGROUND OF THE INVENTION

The present invention relates generally to ground opener units for an agricultural implement and, more particularly, to an assembly for automatically and continually adjusting the down pressure applied to a disc in response to changes in soil conditions to maintain the disc at a relatively constant penetration depth so that the disc cuts an elongated trench in the soil at a substantially constant depth.

A planter generally consists of a toolbar that may be hitched to a tractor and a number of disc opener units mounted to the toolbar. The disc opener units have a disc or coulter that cuts a furrow into a field and a seed tube that deposits seed into the furrow. Some disc opener units are equipped with an additional tube for depositing fertilizer into the furrow. The depth at which the disc penetrates into the field and cuts the furrow is controlled by a gauge wheel. The position of the gauge wheel is typically set by rotating a lever or control arm to one of a series of depth setting positions. While the gauge wheel sets the penetration depth for the disc, a down pressure system, which typically includes a hydraulic cylinder and or spring, applies a down force on the disc to ensure that the disc penetrates into the ground. For most planters, the amount of down force can be adjusted by the operator to accommodate different soil conditions.

Notwithstanding the ability to vary the down force to changing soil conditions, many operators are unsure as to the appropriate down pressure setting for a given soil condition. As a result, many such operators will set the down pressure setting such that an excessive amount of down force is applied and leave the setting unchanged. Thus, unless extreme ground conditions are present, there will always be sufficient down force applied to the disc for the disc to penetrate to the desired cutting depth.

Constantly operating the planter with the down pressure system set to the maximal down pressure setting however can have detrimental effects. More specifically, since the excess down force is transmitted through the gauge wheel assembly, the gauge wheel, control lever, and/or gauge wheel bearings may fail premature if the down pressure system is always set to apply an excessive amount of down pressure.

Thus, there is a need for a down pressure control system that places less stress on the gauge wheel assembly while also applying a down force on the disc that accommodates a varying range of soil conditions.

SUMMARY OF THE INVENTION

The present invention is directed to a down pressure control system that varies the amount of down force that is applied on a disc by a down pressure cylinder in substantially real-time as soil conditions change. As soil conditions change, the strain placed on gauge wheel assembly will also change. This change is measured by a load sensor and is used to reactively change the amount of down force that is applied by the down pressure cylinder. The load sensor, which may be a strain gauge for example, senses the strain placed on the gauge wheel assembly during a change in soil conditions. If the soil conditions soften, the down force applied by the down pressure cylinder will initially stress the gauge wheel assembly as the gauge wheel counters the down force applied. In such an instance, the load center detects the increased strain and provides the information to a controller that provides appropriate control signals to a valve that controls the flow and/or pressure of hydraulic fluid to the down pressure cylinder so that the amount of down force applied to the disc is reduced. On the other hand if the soil conditions harden, the down pressure will be insufficient to drive the disc to the desired penetration depth and a corresponding strain will be measured by the load center. Appropriate control signals will then be communicated to the valve to change the flow of hydraulic fluid so as to increase the amount of down force applied.

It is therefore an object of the invention to provide a down pressure control system that responds automatically to changes in soil conditions to change the amount of down force or pressure that is applied to a disc.

It is another object of the invention to provide a cutting depth monitoring system for a disc opener unit that determines a real-time cutting depth of the disc opener unit and adjusts the amount of down force being applied to the disc opener unit to maintain the cutting depth at a preset level.

It is a further object of the invention to provide a down pressure control system that does not require an operator to set a desired amount of down force to be applied to a disc opener unit.

It is another object of the invention to provide a down pressure control system that optimizes the amount of down force applied on a disc opener unit.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
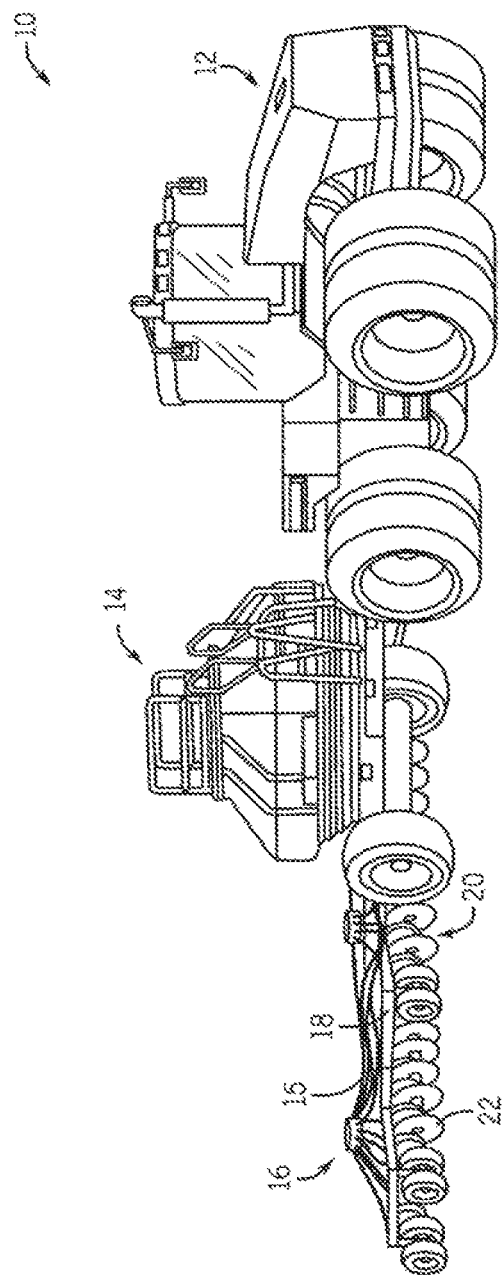
FIG. 1 is a pictorial view of an agricultural system generally comprised of tractor, an air cart, and an implement according to the present invention.

Referring now to the drawings, and more particularly to FIG. 1, an agricultural seeding system 10 is shown and, as known in the art, is generally comprised of a tractor 12, an air cart 14, and an agricultural implement, e.g., seeder 16.

The air cart 14 and the seeder 16 are hitched to the tractor 12 in a conventional manner. The seeder 16 includes a tool bar 18 to which a set of disc opener units 20 are coupled. The disc opener units 20 each include a disc 22 designed to cut a furrow into the soil. As known in the art, the air cart 14 pneumatically delivers seed and/or fertilizer to a set of delivery tubes 15 of the planter 14 whereupon the seed and/or fertilizer is deposited in seed trenches or furrows cut by the discs 22. As further known in the art, the planter 16 includes a hydraulic system comprised of a network of hydraulic cylinders, valves, and conduits that are flow-coupled to a hydraulic fluid source, typically carried by the tractor 12. The hydraulic system is operable to perform various functions associated with operation of the seeder. For example, the seeder 16 is moved between a raised, transport position and a lowered, field engaging position by a hydraulically controlled down pressure assembly. For folding seeders, the hydraulic system can also be used to fold the seeder 16 to have a narrow profile, which is better suited for transport and storage.

Figure 2:
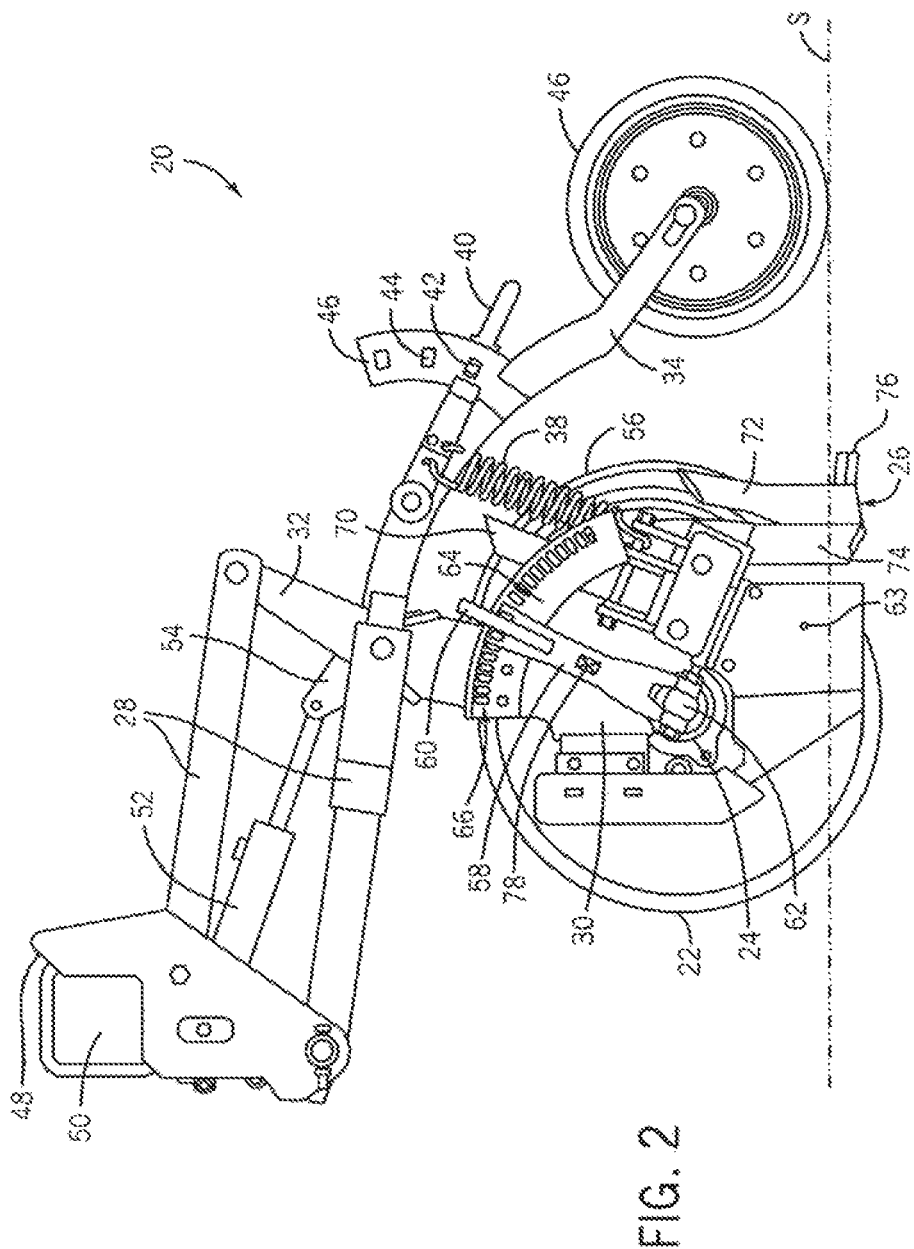
FIG. 2 is a side elevation view of a disc opener unit of the implement of FIG. 1.
Figure 5:
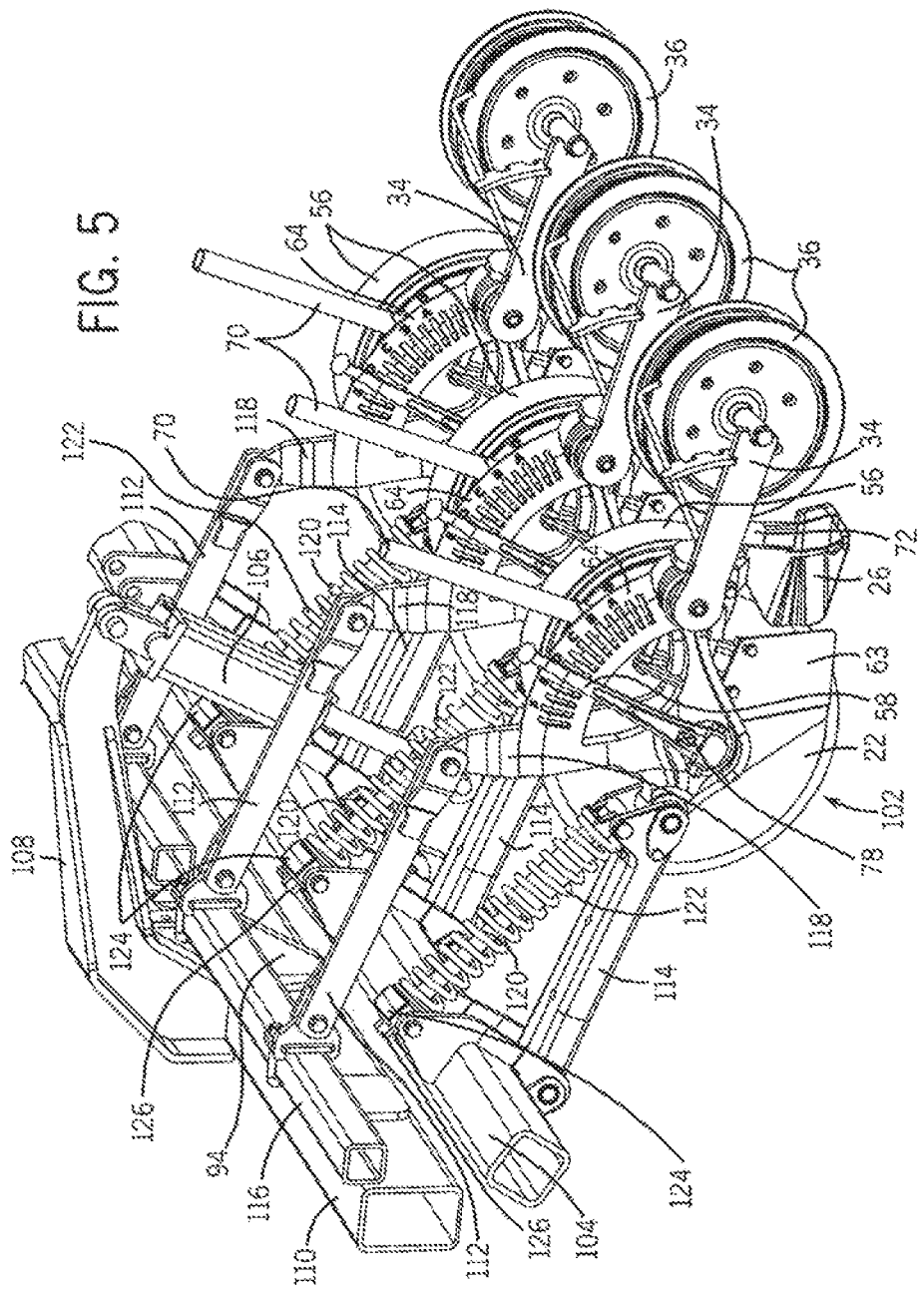
FIG. 5 is an isometric view of a portion of another seeder with which the present invention may be used.

FIG. 2 shows a disc opener ("seeding") unit 20 according to one embodiment of the invention and FIG. 5 shows a gang of disc opener units 102 according to another embodiment of the invention. Turning to FIG. 2, disc opener unit 20 generally includes a forward disc 22 that is angled relative to a line of travel. As known in the art, the forward disc 22 rotates about a center hub 24 to cut a furrow into the planting surface, S. A seed boot 26 is mounted rearward of the disc 22, and is designed to cut a seed trench into the furrow formed by the disc 22. The disc 22 is coupled to a parallel linkage 28 by a disc mount 30, to which a mount arm 32 is weld and extends upwardly from the disc mount 30. A trailing arm 34 is also coupled to the parallel linkage 28 and a press or packing wheel 36 is coupled to the trailing arm 34. The press wheel 36 trails the disc 22 and the seed boot 26, and as known in the art, applies a packing pressure to the furrow. The packing force is applied by spring 38, but it is understood that other biasing devices may be used. In addition, the amount of packing force can be varied via lever 40 which has a selector member 42 that can be selectively positioned in one of a series of notches 44 of curved member 46.

The parallel linkage 28 is also coupled to a toolbar mount 48 that is operative to couple the seeding unit 20 to a toolbar 50 of the seeder 16. A hydraulic cylinder 52 is pivotably coupled to the toolbar mount 48 and the mount arm 32 by a bracket 54. The cylinder 52 is operative to apply a downward pressure on the disc 22 to force the disc 22 to penetrate the seeding surface. The depth at which the disc 22 cuts into the planting surface is variably set by a gauge wheel 56 and a cooperating gauge wheel arm 58 having a handle 60. The arm 58 is coupled to a crankshaft 62 that extends through the center of the disc 22. The gauge wheel arm 58 is held in place by teeth (not shown) that interface with a mating fan shaped member 64, which includes a series of notches 66 that individually define a different depth the disc 22 can be set via positioning of the gauge wheel arm 58.

In addition to setting the depth at which the disc 22 cuts into the planting surface, the gauge wheel 56 keeps the outer surface of the disc 22 generally clear of mud and debris. A scraper blade 63 is mounted opposite the depth gauge wheel 56 is designed to remove dirt, mud, and other debris from the inner surface of the disc 22.

The seeding unit 20 shown in FIG. 2 is a single pass, double-shoot unit. In this regard, the unit 20 is designed to cut a furrow, drop fertilizer, cut a seed trench, and drop seed in a single pass across the planting surface. In this regard, a fertilizer tube 70 is mounted rearward of the center hub of the disc 22 but forward of the seed boot 26. The seed boot 26 generally includes a seed tube 72 and a cutting member 74 that is forward of the seed tube 72. In operation, as the disc 22 forms a furrow having a relatively deep fertilizer trench in the planting surface, fertilizer is dropped into the fertilizer trench from a fertilizer source (not shown) that communicates with the aforementioned fertilizer tube 70. The cutting member 74 is offset from the disc 22 and cuts into a sidewall of the furrow to form a ledge or seed bed. Seed is then dropped via the seed tube 72 onto the ledge. The seed is fed to the seed tube 72 from a seed source in a known manner.

The cutting member 74 cuts into the sidewall of the furrow such that the ledge is offset horizontally and vertically from the fertilizer trench, i.e., bottom of the furrow. In this regard, the seed is deposited at a position that is spaced horizontally and vertically from the fertilizer that is dropped into the fertilizer trench. As noted above, it is generally preferred to place seed and fertilizer into a furrow with stratification between the fertilizer and the seed.

In one preferred embodiment, the cutting member 74 is angled to lift the soil as the cutting member 74 is urged through the sidewall of the furrow. Thus, as the disc 22 and the cutting member 74 cut through the planting surface, the soil is temporarily displaced and lifted to form trenches for the deposition of fertilizer or seed. However, when disc 22 and the cutting member 74 pass, the soil will tend to fall back onto itself and effectively fill-in the furrow and thus the fertilizer and seed trenches. The press wheel 36, which trails the seed boot 26, then packs the fertilizer and the seed. Alternately, the cutting member 74 may be angled downward to force the soil down onto the fertilizer before the seed is deposited onto the seed bed.

In one preferred embodiment, a deflector tab 76 extends from the backside of the seed tube 72. The deflector tab 76 generally provides two separate functions. First, the deflector tab 76 is angled as is the lower ends of the seed tube 72 and the cutting member 74. With this angled orientation, the deflector tab 76 is operative to encourage seed toward the seed trench. Second, because of its proximity to the seed tube 72, the deflector tab 76 reduces the ingress of soil and debris into the seed tube 72 during roll back of the planting unit 20.

As noted above, the pressure in the hydraulic cylinder 52 sets the amount of down pressure that is applied on the disc 22. In a preferred method of operation, a user rotates the gauge wheel arm 58 to a desired depth setting at which the disc 22 is to cut a furrow in the planting surface. The down pressure applied by the cylinder 52, together with the weight of the planting unit 20, forces the disc 22 into the planting surface so that the furrow is cut at the user selected depth. As described above, conventionally, many users, independent of the gauge wheel setting, have a maximum down force applied on the disc. Users will often do this because they are not sure how much down pressure is needed. However, continued excessive down pressure can cause premature failure of the gauge wheel, the depth setting mechanisms, and/or gauge wheel bearings.

As such, in accordance with a preferred embodiment, the present invention provides a planter unit 20 having a strain gauge or load cell 78 mounted to the gauge wheel arm 58. The information gathered from the strain gauge 78 is used control the flow of hydraulic fluid to or from the hydraulic cylinder 52 and thus the amount of down force applied on the disc 22. In this regard, the amount of down force applied by the hydraulic cylinder can be controlled substantially in real-time to maintain a desired seed depth without overstressing the gauge wheel and its related components.

Figure 3:
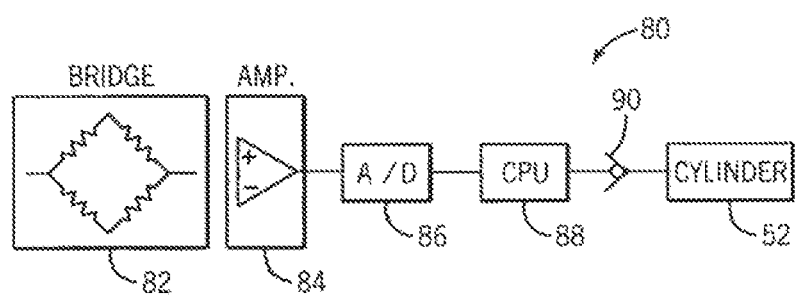
FIG. 3 is a schematic diagram of a down pressure adjustment circuit according to one embodiment of the present invention.

Referring now to FIG. 3, a down pressure control system 80 includes a Wheatstone bridge 82 in communication with an amplifier 84 for amplifying the signal measured by the bridge 84. One skilled in the art will appreciate that a strain gauge can be schematically represented by a Wheatstone bridge. An A/D converter 86 is included for conversion of the analog signal detected by the bridge 82 to a digital signal. A CPU or processor 88 is provided to receive stain measurements as detected by Wheatstone bridge 82 and to determine if pressure in the cylinder 52 should be increased or decreased. Hydraulic fluid flow to and from the cylinder 52 is controlled by a valve 90 and thus the CPU 88 opens and closes the valve 90 as needed to adjust the pressure in the cylinder 52 and thus the amount of down pressure applied on the disc 22.

Figure 4:
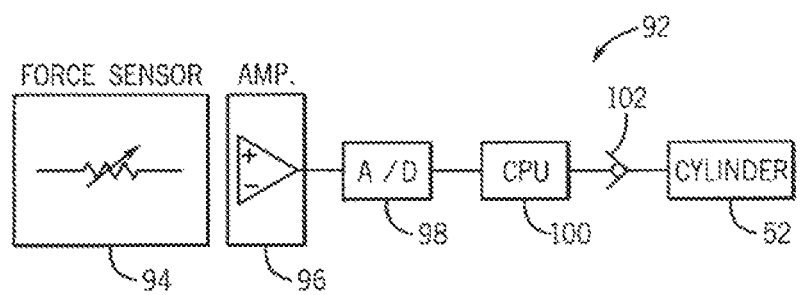
FIG. 4 is a schematic diagram of a down pressure adjustment circuit according to another embodiment of the present invention.

FIG. 4 illustrates another embodiment of a down pressure control system 92. System 92 is substantially similar to the system 80 described above; however, in this embodiment, a force sensor 94 is used for measuring the force applied by the user rather than a Wheatstone bridge. Components 96 through 102 are similar to components 84 through 90 described above.

As referenced above, the present invention is applicable with different types of agricultural implements, such as seeders, planters, and the like. FIG. 2 illustrates one type of disc opener unit incorporating the present invention. FIG. 5 illustrates another type of disc opener arrangement in which multiple disc openers 102 are ganged to a rockshaft 104. The rockshaft 104 is rotated by a hydraulic cylinder 106 that is coupled at one end to the rockshaft 104 and is coupled at the opposite end to a support arm 108 that is mounted to a tool bar 110 or other stationary frame member. Each disc opener unit 102 includes a linkage assembly generally comprised of an upper link 112 and a lower link 114. Upper link 112 may be coupled at one end directly to the tool bar 110, or as illustrated in FIG. 5, is coupled to a rail 116 that is mounted to the tool bar 110. The opposite end of the upper link 112 is coupled to the disc opener bracket or mount 118. The lower link 114 is interconnected between the rockshaft 104 and the disc opener bracket 118. Also interconnected between the rockshaft 104 and the disc opener bracket 118 is a sleeve 120 which supports a spring 122. The spring 122 is coupled to a trunnion 124 at one end and coupled to the lower link 114 at its opposite end. The trunnion 124 is free to slide along the sleeve 120 with rotation of the rockshaft 104. A stop 126 is provided that sets a maximum on how far the spring 120 can be elongated when the rockshaft is rotated counterclockwise (in the figure) by the hydraulic cylinder 106. It will thus be appreciated that as the rockshaft 104 is rotated clockwise (in the figure) by the cylinder 106, the springs 122 will compress and apply down pressure on the disc openers 102. In this regard, the amount of down pressure for multiple disc openers 102 is controlled by a single hydraulic cylinder. Strain measurements may then be taken from a load sensor, e.g., strain gauge 78, mounted to a depth setting arm 58 of one of the disc openers 102 and transmitted to CPU 88 as described above to control the amount of pressure in the hydraulic cylinder 106 and thus the amount of down pressure applied to the ganged disc openers 102. However, it is contemplated that load sensors could be mounted to the depth setting arms of each disc opener and that the CPU could apply one of a number of statistical or numerical evaluations, e.g., averaging, on the multiple strain gauge readings to determine an appropriate down pressure adjustment.

In operation, an operator sets the gauge wheel 56 to a desired seed depth and sets the down pressure to a desired value based on experience and field conditions. As the seeder 16 is initially lowered into the field engaging position and the planter units 20, 102 begin to cut furrows into the planting surface, the stain gauge 78 provides feedback to the CPU 88 corresponding to the deformation of the gauge wheel arm 58. Generally, if the amount of down pressure applied by the cylinder 52 (or 106) is excessive, the down pressure will try to force the disc 22 farther into the planting surface resulting in deformation, e.g., slight bending, of the gauge wheel arm 58, which will be detected by the strain gauge 78. On the other hand, if the down pressure applied by the cylinder 52 (or 106) is insufficient to hold the disc 22 at the desired furrow cutting depth, a reverse bending of the gauge wheel arm 58 will occur and be detected by the strain gauge 78. If the amount of down pressure is appropriate, a minimum threshold of deformation of the strain gauge arm 58 will occur. In this regard, as the disc 22 is pulled through the planting surface, strain measurements are taken and provided to the CPU, which in turn compares the measured strain values to a range of "no-action" values. That is, if the amount of strain falls within that range, the CPU will not effectuate any changes to the amount of pressure in the hydraulic cylinder 52 (or 106). This would be for events such as when the gauge wheel rolls over an obstacle such as a rock. However, if the stain measurements are outside the range of "no-action" values, the CPU will cause an increase or decrease in pressure in the hydraulic cylinder 52 (or 106) to vary the amount of down pressure the cylinder 52 (or 106) applies on disc 22. The range of "no action" values preferably has a width that avoids constant changing of the hydraulic pressure, but avoids undesirable over-force or under-force on the disc 22.

In another preferred implementation, by default, the hydraulic cylinder 52 (or 106) is set to provide a maximum down pressure on the disc 22. Strain measurements are then taken as the disc 22 is pulled through the planting surface and hydraulic pressure is reduced from the maximum level as appropriate based on feedback provided by the strain gauge. It is believed that initially setting the down pressure to a maximal level and then reducing the down pressure as needed provides two advantages. First, it ensures that there is initially enough down pressure for the disc 22 to cut through the planting surface to the desired cutting depth. Second, reducing the down pressure can be done relatively quickly to provide a quickened response time to achieve an optimized down pressure setting for a given soil condition.

Many changes and modifications could be made to the invention without departing from the spirit thereof. The scope of these changes will become apparent from the appended claims.

We claim:

1. A method for operating an agricultural implement, the method comprising:
  controlling an operation of a cylinder to apply a down force on a disc opener unit of the agricultural implement such that a disc of the disc opener unit cuts a trench into the ground at a desired penetration depth;
  monitoring a load applied through a gauge wheel assembly of the disc opener unit as the disc is being used to cut the trench into the ground, the gauge wheel assembly including a gauge wheel and a depth control arm coupled to the gauge wheel via a crankshaft extending through the disc, the depth control arm including a first end coupled to the crankshaft and a second end opposite the first end, wherein monitoring the load applied through the gauge wheel assembly comprises:
monitoring the load applied through the gauge wheel assembly using a load sensor installed on the depth control arm as the depth control arm is engaged with a depth adjustment member of the disc opener unit at a location adjacent to the second end of the depth control arm; and
controlling the operation of the cylinder to adjust the down force applied on the disc opener unit when the monitored load increases above or decreases below a given setpoint.

2. The method of claim 1, wherein monitoring the load applied through the gauge wheel assembly using the load sensor comprises automatically monitoring the load applied through the gauge wheel assembly via a controller coupled to the load sensor, and wherein controlling the operation of the cylinder comprises automatically controlling the operation of the cylinder via the controller, the controller including a processor.

3. The method of claim 1, wherein monitoring the load applied through the gauge wheel assembly using the load sensor comprises monitoring the load transmitted through the depth control arm of the gauge wheel assembly based on data received from the load sensor, the detected load being indicative of an actual down pressure being applied on the disc opener unit.

4. The method of claim 3, wherein controlling the operation of the cylinder comprises controlling the operation of the cylinder such that the monitored load is maintained within a given range of load values associated with maintaining the actual down pressure equal or substantially equal to a desired down pressure for the disc opener unit.

5. The method of claim 1, wherein the crankshaft extends through the disc such that the depth control arm is positioned on a first side of the disc and the gauge wheel is positioned on an opposed second side of the disc, the depth adjustment member being positioned on the first side of the disc, and
wherein monitoring the load applied through the gauge wheel assembly using the load sensor comprises monitoring the load applied through the gauge wheel assembly using the load sensor as the depth control arm is engaged with the depth adjustment member along the first side of the disc.

6. The method of claim 5, wherein the depth adjustment member comprises a plurality depth setting positions, the depth control arm configured to be selectively engaged with the depth adjustment member at one of the plurality of depth setting positions to set a penetration depth of the disc, and
wherein monitoring the load applied through the gauge wheel assembly using the load sensor comprises monitoring the load applied through the gauge wheel assembly using the load sensor as the depth control arm is engaged with the depth adjustment member at a first depth setting position of the plurality of depth setting positions to set the penetration depth of the disc.

7. The method of claim 1, wherein the load sensor is installed on the depth control arm at a location between the first and second ends of the depth control arm, and
wherein monitoring the load applied through the gauge wheel assembly using the load sensor comprises monitoring the load applied through the gauge wheel assembly at the location between the first and second ends of the depth control arm.

8. The method of claim 1, wherein monitoring the load applied through the gauge wheel assembly using the load sensor comprises wherein monitoring the load applied through the gauge wheel assembly using one of a strain gauge or a load cell.

9. A method for operating an agricultural implement, the method comprising:
controlling an operation of a cylinder to apply a down force on a disc opener unit of the agricultural implement such that a disc of the disc opener unit cuts a trench into the ground at a desired penetration depth;
monitoring a load applied through a gauge wheel assembly of the disc opener unit as the disc is being used to cut the trench into the ground, the gauge wheel assembly including a gauge wheel and a depth control arm coupled to the gauge wheel via a crankshaft extending through the disc such that the depth control arm is positioned on a first side of the disc and the gauge wheel is positioned on an opposed second side of the disc, wherein monitoring the load applied through the gauge wheel assembly comprises:
monitoring the load applied through the gauge wheel assembly using a load sensor installed on the depth control arm as the depth control arm is engaged with a depth adjustment member of the disc opener unit along the first side of the disc; and
controlling the operation of the cylinder to adjust the down force applied on the disc opener unit when the monitored load increases above or decreases below a given setpoint.

10. The method of claim 9, wherein monitoring the load applied through the gauge wheel assembly using the load sensor comprises automatically monitoring the load applied through the gauge wheel assembly via a controller coupled to the load sensor, and wherein controlling the operation of the cylinder comprises automatically controlling the operation of the cylinder via the controller, the controller including a processor.

11. The method of claim 9, wherein monitoring the load applied through the gauge wheel assembly using the load sensor comprises monitoring the load transmitted through the depth control arm of the gauge wheel assembly based on data received from the load sensor, the detected load being indicative of an actual down pressure being applied on the disc opener unit.

12. The method of claim 11, wherein controlling the operation of the cylinder comprises controlling the operation of the cylinder such that the monitored load is maintained within a given range of load values associated with maintaining the actual down pressure equal or substantially equal to a desired down pressure for the disc opener unit.

13. The method of claim 9, wherein the depth control arm includes a first end coupled to the crankshaft and a second end opposite the first end, the depth control arm extending between the first and second ends along the first side of the disc, and
wherein monitoring the load applied through the gauge wheel assembly using the load sensor comprises monitoring the load applied through the gauge wheel assembly using the load sensor as the depth control arm is engaged with the depth adjustment member at a location adjacent to the second end of the depth control arm.

14. The method of claim 9, wherein the depth adjustment member comprises a plurality depth setting positions, the depth control arm configured to be selectively engaged with the depth adjustment member at one of the plurality of depth setting positions to set a penetration depth of the disc, and wherein monitoring the load applied through the gauge wheel assembly using the load sensor comprises monitoring the load applied through the gauge wheel assembly using the load sensor as the depth control arm is engaged with the depth adjustment member at a first depth setting position of the plurality of depth setting positions to set the penetration depth of the disc.

15. The method of claim 9, wherein monitoring the load applied through the gauge wheel assembly using the load sensor comprises wherein monitoring the load applied through the gauge wheel assembly using one of a strain gauge or a load cell.

16. The method of claim 9, wherein the load sensor is installed on the depth control arm at a location between the first and second ends of the depth control arm, and
wherein monitoring the load applied through the gauge wheel assembly using the load sensor comprises monitoring the load applied through the gauge wheel assembly at the location between the first and second ends of the depth control arm.

17. A down pressure control system for an agricultural implement, the down pressure control system comprising:
a disc opener unit including a disc configured to cut a trench into the ground and a gauge wheel assembly configured to set a penetration depth of the disc, the gauge wheel assembly comprising a gauge wheel and a depth control arm coupled to the gauge wheel via a crankshaft extending through the disc such that the depth control arm is positioned on a first side of the disc and the gauge wheel is positioned on an opposed second side of the disc, the depth control arm configured to be coupled to a depth adjustment member of the disc opener unit, the depth adjustment member being positioned on the first side of the disc;
a load sensor positioned on the first side of the disc, the load sensor being configured to provide an indication of a load applied through the gauge wheel assembly; and
a controller configured to monitor the load based on data received from the load sensor, the controller being further configured to adjust a down force applied on the disc opener unit when the monitored load increases above or decreases below a given setpoint.

18. The down pressure control system of claim 17, wherein the depth control arm includes a first end coupled to the crankshaft and a second end opposite the first end, the depth control arm extending between the first and second ends along the first side of the disc, the load sensor being positioned on the first side of the disc at a location disposed vertically between the first and second ends of the depth control arm.

19. The down pressure control system of claim 17, wherein the depth control arm includes a first end coupled to the crankshaft and a second end opposite the first end, the load sensor being configured to provide the indication of the load by detecting the load transmitted between the first end of the depth control arm and the depth adjustment member along the first side of the disc.

20. The down pressure control system of claim 19, wherein the load detected by the load sensor is indicative of an actual down pressure being applied on the disc opener unit, the controller being configured to control the operation of a cylinder operatively coupled to the disc opener unit such that the monitored load is maintained within a given range of load values associated with maintaining the actual down pressure equal or substantially equal to a desired down pressure for the disc opener unit.

21. The down pressure control system of claim 17, wherein the depth adjustment member comprises a plurality depth setting positions, the depth control arm configured to be moved relative to the depth adjustment member along the first side of the disc to set a desired penetration depth of the disc, the desired penetration depth being associated with one of the plurality of depth setting positions.

22. The down pressure control system of claim 17, wherein the load sensor comprises a strain gauge or a load cell.

* * * * *